(12) United States Patent
Fujii

(10) Patent No.: US 11,128,762 B2
(45) Date of Patent: Sep. 21, 2021

(54) INFORMATION PROCESSING DEVICE AND FAULT PRESUMPTION METHOD

(71) Applicant: KYOCERA Document Solutions Inc., Osaka (JP)

(72) Inventor: Koji Fujii, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/796,508

(22) Filed: Feb. 20, 2020

(65) Prior Publication Data
US 2020/0274975 A1 Aug. 27, 2020

(30) Foreign Application Priority Data

Feb. 21, 2019 (JP) .............................. JP2019-029724

(51) Int. Cl.
*H04N 1/00* (2006.01)
*H04N 1/32* (2006.01)
*G06N 3/08* (2006.01)

(52) U.S. Cl.
CPC ........... *H04N 1/00076* (2013.01); *G06N 3/08* (2013.01); *H04N 1/00029* (2013.01); *H04N 1/32625* (2013.01)

(58) Field of Classification Search
None
See application file for complete search history.

(56) References Cited

U.S. PATENT DOCUMENTS

| 2012/0054758 | A1* | 3/2012 | Wataishi | H04N 1/00408 718/102 |
| 2018/0278740 | A1* | 9/2018 | Choi | H04M 1/72403 |
| 2020/0245009 | A1* | 7/2020 | Saini | H04N 21/6582 |

FOREIGN PATENT DOCUMENTS

JP 2011-210259 A 10/2011

* cited by examiner

*Primary Examiner* — Frantz Bataille
(74) *Attorney, Agent, or Firm* — Studebaker & Brackett PC

(57) ABSTRACT

An information processing device includes an acquiring section, an encoding section, and a learning section. The acquiring section acquires log information indicating an operational condition of an electronic device. The encoding section assigns codes uniquely corresponding to the log information to the log information. The learning section applies the codes to a learning model that uses a recurrent neural network to presume an appearance probability of the log information corresponding to the codes.

6 Claims, 8 Drawing Sheets

```
  0  MailBox Over mbx=%d msg=0x%x
  1  msgcnt=%d,msgmax=%d
  2  mbx=%d,threadid=%d,msgid=0x%x,data1=%d,data2=0x%x
  3  Error msg threadId:mbx=%d,threadid=%d,msgid=0x%x,data1=%d,data2=0x%x
  4  CurrentTaskInfo:mbx=%d,threadid=%d,msgid=0x%x,data1=%d,data2=0x%x
  5  Log Massage File Hash=%ld,Inifile Hash=%ld
  6  %d %d %d
  7  ActiveSpeed Type Irregular (%d)
  .
  .
3409  %2d,%4d:Remaining_sheet_amount detection (Cassette 4)
3410  %2d,%4d:Cassette insertion detection (Cassette 3)
3411  %2d,%4d:Cassette insertion detection (Cassette 4)
3412  %2d,%4d:Fixing unit connection detection
3413  %2d,%4d:Keycard (DC-1) setting detection
3414  %2d,%4d:Key counter connection detection
3415  %2d,%4d:Cassette insertion detection (Cassette 1)
3416  %2d,%4d:LVU identification
3417  %2d,%4d:JOB tray paper presence detection
```

INFORMATION PROCESSING DEVICE AND FAULT PRESUMPTION METHOD

INCORPORATION BY REFERENCE

The present application claims priority under 35 U.S.C. § 119 to Japanese Patent Application No. 2019-029724, filed on Feb. 21, 2019. The contents of this application are incorporated herein by reference in their entirety.

BACKGROUND

The present disclosure relates to an information processing device and a fault presumption method.

When a fault such as a malfunction occurs in an electronic device such as an image forming apparatus, the state of the fault must be grasped and the cause of the fault must be specified quickly. Therefore, a technique has been proposed for acquiring data for debugging (performing a debugging log) only when a fault is likely to occur.

SUMMARY

An information processing device according to an aspect of the present disclosure includes an acquiring section, an encoding section, and a learning section. The acquiring section acquires first log information indicating an operational condition of an electronic device. The encoding section assigns first codes uniquely corresponding to the first log information to the first log information. The learning section causes a learning model that uses a neural network to learn by applying the first codes to the learning model so as to output a first probability distribution indicating an appearance probability of the first log information corresponding to the first codes.

A fault presumption method according to an aspect of the present disclosure includes: acquiring first log information indicating an operational state of an electronic device; assigning first codes uniquely corresponding to the first log information to the first log information; and causing a learning model that uses a neural network to learn by applying the first codes to the learning model so as to output a first probability distribution indicating an appearance probability of the first log information corresponding to the first codes.

BRIEF DESCRIPTION OF THE DRAWINGS

FIG. 4 is a diagram illustrating an example of a software log dictionary according to the present embodiment.

FIG. 5 is a diagram illustrating an example of a corpus and binary data of the corpus according to the present embodiment.

DETAILED DESCRIPTION

Figure 1:
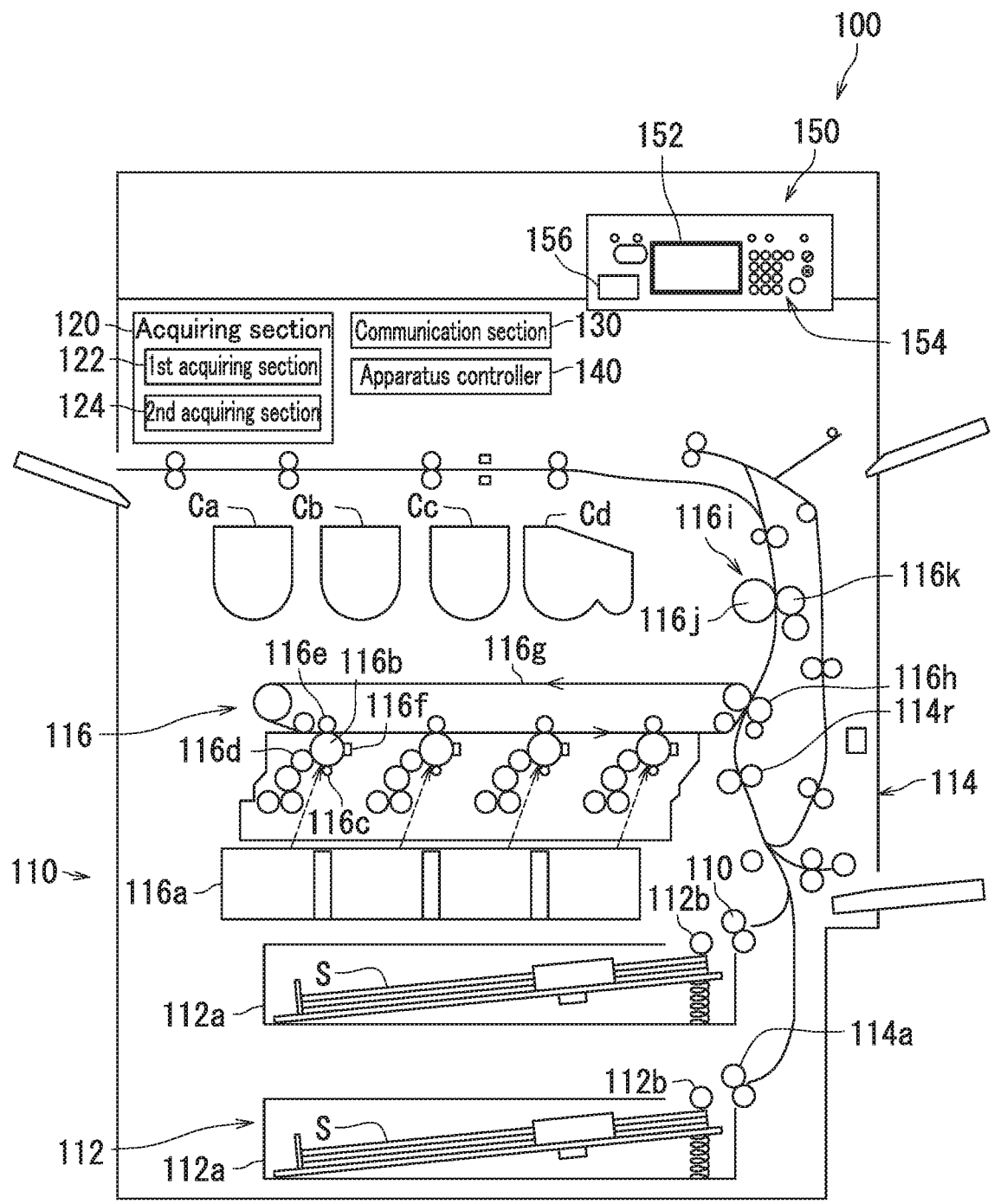
FIG. 1 is a schematic illustration of a configuration of an image forming apparatus according to an embodiment of the present disclosure.

The following describes an embodiment of the present disclosure with reference to the accompanying drawings. Elements that are the same or equivalent are labeled with the same reference signs in the drawings and description thereof is not repeated.

First, a configuration of an image forming apparatus 100 according to the present embodiment is described with reference to FIG. 1. FIG. 1 is a schematic illustration of the configuration of the image forming apparatus 100. The image forming apparatus 100 forms an image on a sheet S. Examples of the image forming apparatus 100 include a printer, a copier, and a multifunction peripheral. The image forming apparatus 100 may also have a faxing function. In the present embodiment, the image forming apparatus 100 is an electrographic image forming apparatus.

The image forming apparatus 100 is an example of an "information processing device". Herein, the information processing device according to the present disclosure is not limited to the image forming apparatus 100. Furthermore, the image forming apparatus 100 is integrated with the information processing device, but is not limited to an integrated electronic device. For example, the information processing device may be a server connected to a network. Therefore, the server may receive software log information from the electronic device through the network and presume the likelihood of a fault in the electronic device.

The image forming apparatus 100 includes an image forming section 110, an acquiring section 120, a communication section 130, an apparatus controller 140, and an input and output section 150. The image forming section 110, the acquiring section 120, the communication section 130, and the apparatus controller 140 are arranged within a casing of the image forming apparatus 100.

The image forming section 110 forms an image on the sheet S. Examples of the sheet S include plain paper, recycled paper, thin paper, thick paper, copy paper, or an overhead projector (OHP) sheet.

The acquiring section 120 acquires log information indicating an operational condition of the electronic device. Specifically, the acquiring section 120 acquires software log information indicating the operational condition of the electronic device during execution of a control program. Herein, "software log information" means lines of information in which behavior of the electronic device controlled according to the control program is recorded in chronological order along with timestamps or the like. For example, the software log information indicates items such as a state of the electronic device, a control result of each function, a state of error or failure, and a state of communication with another electronic device. The acquiring section 120 includes a first acquiring section 122 and a second acquiring section 124.

The first acquiring section 122 acquires first log information indicating the operational condition of the electronic device. Herein, the "first log information" is software log information used to learn a first probability distribution in the same manner as a learning model of natural language processing. In the present embodiment, the first log information includes about 3000 to 4000 pieces of software log information, for example. The first probability distribution indicates an appearance probability of each piece of software log information included in the first log information.

The second acquiring section 124 acquires second log information indicating the operational condition of the electronic device. Here, the "second log information" is software log information used to deduce a second probability distribution through application to a learned learning model. In the present embodiment, the second log information includes about 1000 to 1500 pieces of software log information, for example. The second probability distribution indicates an appearance probability of each piece of software log information included in the second log information. The second log information and the first log information are information of the same type but with different content.

The communication section 130 is capable of communication with an electronic device equipped with a communication device which uses the same communication method (protocol) as the communication section 130. Specifically, the communication section 130 communicates with another electronic device through a network such as a local area network (LAN). The communication section 130 is a communication module (communication device) such as a LAN board, for example.

The apparatus controller 140 controls the operation of each element of configuration of the image forming apparatus 100 by executing the control program. Furthermore, the apparatus controller 140 uses a learning model including a neural network to presume the likelihood of a fault in the image forming apparatus 100. Specifically, the apparatus controller 140 inputs codes indicating the software log information to a recurrent neural network (may be referred to in the following as an "RNN") and presumes the likelihood of a fault in the electronic device using the same method as a learning model for natural language processing. In the RNN for example, it is presumed that a fault is likely when peculiar software log information is detected. That is, the neural network includes a recurrent neural network. Accordingly, log information recorded in chronological order can be handled as data input to a learning model. The RNN has an input layer, a hidden layer, and an output layer. Note that the hidden layer may be one layer, or two or more layers.

The input and output section 150 notifies a user of each type of information. Specifically, the input and output section 150 notifies of information indicating that a fault is likely when the apparatus controller 140 has determined that a fault is likely. Furthermore, the input and output section 150 receives an instruction from the user. The input and output section 150 includes a display section 152, a receiving section 154, and an audio output section 156.

The display section 152 displays various information on a screen. Specifically, the display section 152 displays content indicating that a fault is likely on a screen when the apparatus controller 140 has determined that a fault is likely.

The display section 152 includes a display and a touch sensor. The display section 152 is a touch panel including a liquid-crystal display, for example. Note that the display is not limited to a liquid-crystal display and may be an organic electroluminescent (EL) display, for example.

The touch sensor detects a touch by a detection target. The touch sensor outputs a detection signal indicating the location where the touch by the detection target was detected. An example of the detection target is a finger of the user. The touch sensor is a resistive touch sensor, for example.

The receiving section 154 includes a numeric keypad, a start key, and a cancel key, for example. At least one of the receiving section 154 and the touch sensor receives an instruction from the user.

The audio output section 156 notifies of various information through audio. Specifically, the audio output section 156 notifies through audio that a fault in the electronic device is likely when the apparatus controller 140 determines that a fault is likely in the electronic device.

The image forming section 110 includes a feeding section 112, a conveyance section 114, and an imaging section 116. The feeding section 112 houses sheets S. The feeding section 112 feeds the sheets S a sheet at a time as needed.

The feeding section 112 includes cassettes 112*a* and feeding rollers 112*b*. The cassettes 112*a* each house a plurality of sheets S. The feeding rollers 112*b* each feed the sheets S housed in a corresponding one of the cassettes 112*a*. The feeding rollers 112*b* feed the sheets S housed in a corresponding one of the cassettes 112*a* a sheet at a time starting with the uppermost sheet S. Herein, the feeding section 112 includes a plurality of cassettes 112*a*, and the feeding rollers 112*b* are installed in corresponding cassettes 112*a*.

The conveyance section 114 conveys the sheets S fed by the feeding section 112 to the imaging section 116. In detail, the conveyance section 114 conveys the sheets S fed by the feeding section 112 to the imaging section 116 a sheet at a time. After the imaging section 116 has formed an image on a sheet S, the conveyance section 114 conveys the sheet S from the imaging section 116 and ejects the sheet S out of the image forming apparatus 100.

The conveyance section 114 includes a plurality of conveyance rollers 114*a*. The conveyance rollers 114*a* convey the sheet S. In the conveyance section 114, the conveyance path of the sheet S is formed by the conveyance rollers 114*a*.

The conveyance rollers 114*a* include rotating rollers. Each rotating roller rotates around a rotational axis thereof. Typically, the conveyance rollers 114*a* include pairs of rotating rollers. The rotating rollers of each pair of rotating rollers rotate in opposite directions to each other around rotational axes thereof. In an example, one of the rotational rollers in each pair of rotational rollers rotates according to the motive power of a motor, and the other rotating roller rotates by following. A sheet S is inserted between the pair of rotating rollers, urged by the rotating rollers, and pushed out from the rotating rollers.

The conveyance rollers 114*a* include a registration roller 114*r*. The registration roller 114*r* adjusts the timing at which each sheet S is conveyed to the imaging section 116. The registration roller 114*r* temporarily stops conveyance of the sheet S and conveys the sheet S to the imaging section 116 at a timing prescribed for the imaging section 116.

Toner containers Ca to Cd are attached to the image forming apparatus 100. Each of the toner containers Ca to Cd is freely attachable to and detachable from the image forming apparatus 100. The toner containers Ca to Cd each contain a different color toner. The toners of the toner containers Ca to Cd are supplied to the image forming section 110. The image forming section 110 forms an image using the toners supplied from the toner containers Ca to Cd.

For example, the toner container Ca contains yellow toner and supplies the yellow toner to the imaging section 116. The toner container Cb contains magenta toner and supplies the magenta toner to the imaging section 116. The toner container Cc contains cyan toner and supplies the cyan toner to the imaging section 116. The toner container Cd contains black toner and supplies the black toner to the imaging section 116.

The imaging section 116 uses the toners contained in the toner containers Ca to Cd to form an image on a sheet S based on image data. Here, the imaging section 116 includes an exposure section 116a, photosensitive drums 116b, chargers 116c, developing sections 116d, primary transfer rollers 116e, cleaners 116f, an intermediate transfer belt 116g, a secondary transfer roller 116h, and a fixing section 116i.

The intermediate transfer belt 116g rotates by rotating rollers rotating according to the motive power of a motor. A motor is mounted in the developing section 116d. Toner in the developing section 116d is stirred by the rotation of the motor.

A photosensitive drum 116b, a charger 116c, a developing section 116d, a primary transfer roller 116e, and a cleaner 116f are provided corresponding to each of the toner containers Ca to Cd. The plurality of photosensitive drums 116b are arranged along the intermediate transfer belt 116g in the rotational direction of the intermediate transfer belt 116g while in contact with the outer surface of the intermediate transfer belt 116g. The plurality of primary transfer rollers 116e are provided for the respective photosensitive drums 116b. The primary transfer rollers 116e are arranged opposite to the respective photosensitive drums 116b with the intermediate transfer belt 116g therebetween.

The chargers 116c charge the peripheral surfaces of the respective photosensitive drums 116b. The exposure sections 116a irradiate respective photosensitive drums 116b with light based on image data to form electrostatic latent images on the peripheral surfaces of the respective photosensitive drums 116b. The developing sections 116d attach toner to respective electrostatic latent images to develop the electrostatic latent images, thus forming toner images on the peripheral surfaces of the respective photosensitive drums 116b. Accordingly, the respective photosensitive drums 116b carry the toner images. The primary transfer rollers 116e transfer respective toner images formed on the photosensitive drums 116b to the outer surface of the intermediate transfer belt 116g. The cleaners 116f remove remaining toners from the peripheral surfaces of the respective photosensitive drums 116b.

The photosensitive drum 116b corresponding to the toner container Ca forms a yellow toner image based on the electrostatic latent image formed thereon. The photosensitive drum 116b corresponding to the toner container Cb forms a magenta toner image based on the electrostatic latent image formed thereon. The photosensitive drum 116b corresponding to the toner container Cc forms a cyan toner image based on the electrostatic latent image formed thereon. The photosensitive drum 116b corresponding to the toner container Cd forms a black toner image based on the toner image formed thereon.

The different colored toner images are transferred from the photosensitive drums 116b and superimposed on the outer surface of the intermediate transfer belt 116g, thus forming an image. As such, the intermediate transfer belt 116g carries the image. The secondary transfer roller 116h transfers the image formed on the outer surface of the intermediate transfer belt 116g to the sheet S.

The fixing section 116i applies heat and pressure to the sheet S to which the image has been transferred, thus fixing the image to the sheet S. The fixing section 116i includes a heating roller 116j and a pressure roller 116k. The heating roller 116j and the pressure roller 116k are arranged opposite to each other and form a fixing nip. After passing between the intermediate transfer belt 116g and the secondary transfer roller 116h, the sheet S is pressed and heated to a prescribed fixing temperature while passing through the fixing nip. As a result, the image is fixed to the sheet S. The conveyance section 114 ejects the sheet S with the image fixed thereto out of the image forming apparatus 100.

Figure 2:
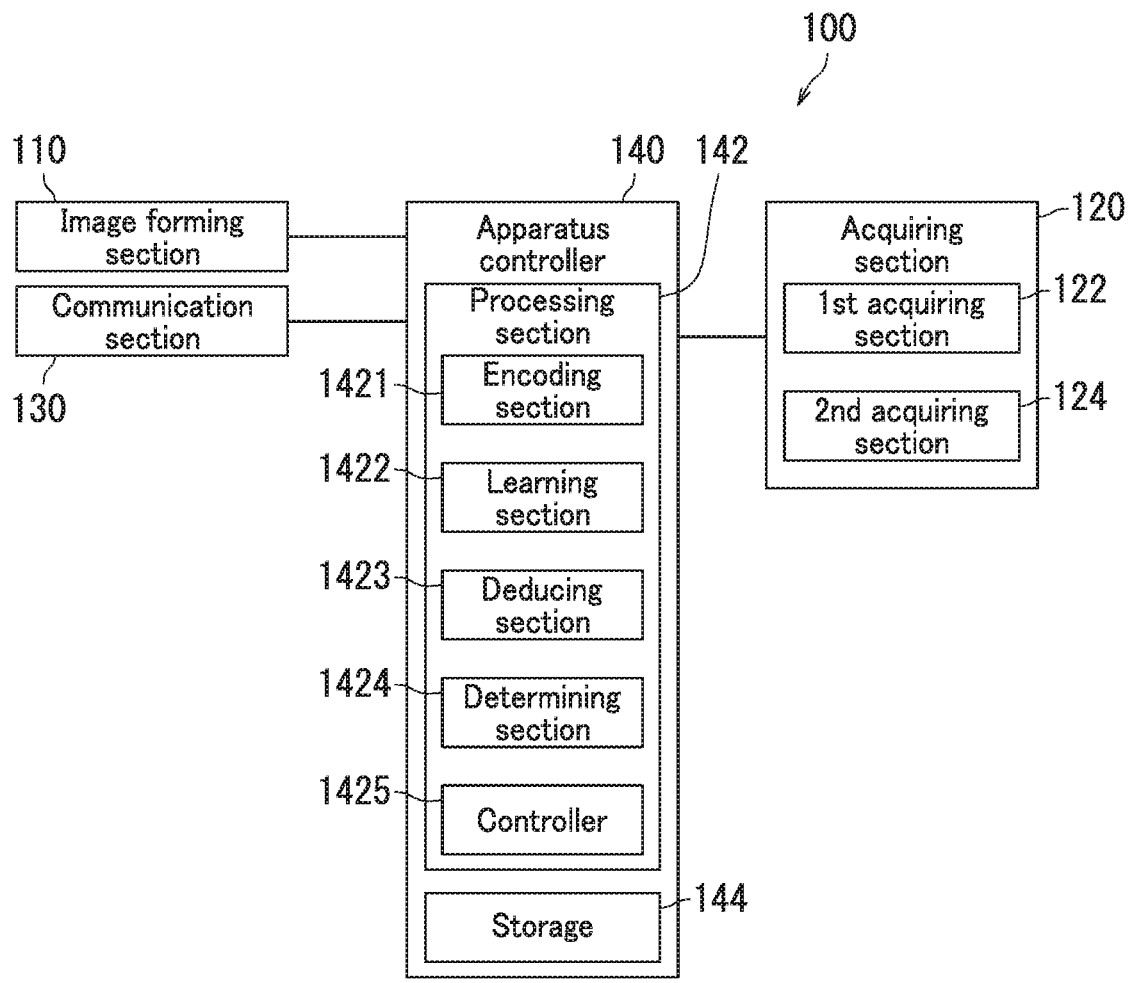
FIG. 2 is a block diagram illustrating the configuration of the image forming apparatus according to the present embodiment.

Next, the configuration of the image forming apparatus 100, particularly the configuration of the apparatus controller 140, is described in detail with reference to FIGS. 1 and 2. FIG. 2 is a block diagram illustrating the configuration of the image forming apparatus 100.

As illustrated in FIG. 2, the apparatus controller 140 includes a processing section 142 and storage 144. The processing section 142 is a processor, for example. The processor is a central processing unit (CPU), for example. The processing section 142 controls operation of each element of configuration of the image forming apparatus 100 by executing a control program stored in the storage 144.

The processing section 142 includes an encoding section 1421, a learning section 1422, a deducing section 1423, a determining section 1424, and a controller 1425. In the present embodiment, the processing section 142 executes the control program stored in the storage 144, and the control program therefore implements the functions of the encoding section 1421, the learning section 1422, the deducing section 1423, the determining section 1424, and the controller 1425.

The encoding section 1421 assigns codes uniquely corresponding to lines of information in a software log dictionary described later with reference to FIG. 4. Specifically, the encoding section 1421 assigns ID numbers to every line of information which can be acquired as software log information. In the present embodiment, the encoding section 1421 assigns ID numbers to every line of information which can be acquired as the first log information or the second log information to generate a software log dictionary. An ID number is an example of an "identification number".

Furthermore, the encoding section 1421 appropriates ID numbers assigned to the software log dictionary to all software log information included in the first log information. In detail, the encoding section 1421 appropriates ID numbers assigned to the software log dictionary and assigns first codes uniquely corresponding to the first log information to the first log information. Furthermore, the encoding section 1421 appropriates ID numbers assigned to the software log dictionary to all software log information included in the second log information in the same manner as that included in the first log information. In detail, the encoding section 1421 appropriates ID numbers assigned to the software log dictionary and assigns second codes uniquely corresponding to the second log information to the second log information.

The learning section 1422 applies the first codes to the learning model that uses the neural network, thereby causing the learning model to learn the first probability distribution indicating the appearance probability of the first log information corresponding to the first codes. Specifically, the learning section 1422 enters the first codes into the learning model that uses the RNN and causes the learning model to learn the first probability distribution based on an output result of the learning model.

In the present embodiment, the learning section 1422 enters all of the first codes in order into the learning model including the RNN, and causes the learning model to learn the first probability distribution indicating the appearance probability of all software log information included in the first log information. Specifically, the learning section 1422 uses a so-called "one-hot vector" to enter all of the first codes in order into the learning model and causes the learning model to learn the appearance probability of all of the first codes. In doing so, the learning section 1422 calculates a measurement error related to an appearance order of the first codes indicating an output result output from the learning model and an appearance order of the first codes which is training data. The learning section 1422 updates so-called "weight" and "bias", which are parameters of the learning model, based on the calculated measurement error. As such, the learning section 1422 causes the learning model to learn based on the appearance probability of all of the first codes.

The deducing section 1423 inputs the second codes to the learning model including the RNN and deduces the second probability distribution indicating the appearance probability of the second log information corresponding to the second codes based on the output result from the learning model. In detail, the deducing section 1423 inputs the second codes into the learning model including the RNN and causes the learning model to output the second probability distribution indicating the appearance probability of the second log information. Specifically, the deducing section 1423 deduces the appearance probability of a second code which appears after a specific second code based on the second probability distribution output by the learning model. That is, the deducing section 1423 deduces, for each of the second codes, probability of another second code appearing after the second code. As such, the deducing section 1423 deduces the appearance probability of all of the second codes. In addition, the deducing section 1423 deduces an appearance order of the second log information based on the second probability distribution output by the learning model. Specifically, the deducing section 1423 deduces a second code which appears after a specific second code based on the second probability distribution output by the learning model. That is, the deducing section 1423 deduces, for each of the second codes, another second code appearing after the second code. The deducing section 1423 deduces the appearance order of the second log information to derive a deduced appearance order of the second log information. That is, the deducing section 1423 deduces a deduced appearance order of the second log information.

The determining section 1424 determines the likelihood of a fault in the image forming apparatus 100 based on a comparison between the deduced appearance order of the second log information specified by the deduced second probability distribution and an actual appearance order indicated by the second log information.

The controller 1425 controls each element of configuration of the image forming apparatus 100 by executing the control program stored in the storage 144. That is, the controller 1425 controls operation of the image forming apparatus 100. The controller 1425 includes a logic element. The logic element includes a processor. In an example, the processor includes a central processing unit (CPU). The processor may also include an application-specific integrated circuit (ASIC).

The storage 144 stores various data and the control program. The storage 144 is constituted by one or more of read-only memory (ROM), random-access memory (RAM), and a solid-state drive (SSD), for example. The storage 144 may include external memory. The external memory is a removable medium. Examples of the removable medium included in the storage 144 may include Universal Serial Bus (USB) memory and a Secure Digital (SD) card.

Furthermore, the storage 144 non-temporarily records the control program to a computer-readable storage medium. Examples of the computer-readable storage medium to which the control program is non-temporarily recorded include read-only memory (ROM), random-access memory (RAM), compact disc read-only memory (CD-ROM), magnetic tape, a magnetic disk, and an optical data storage device.

Figure 3:
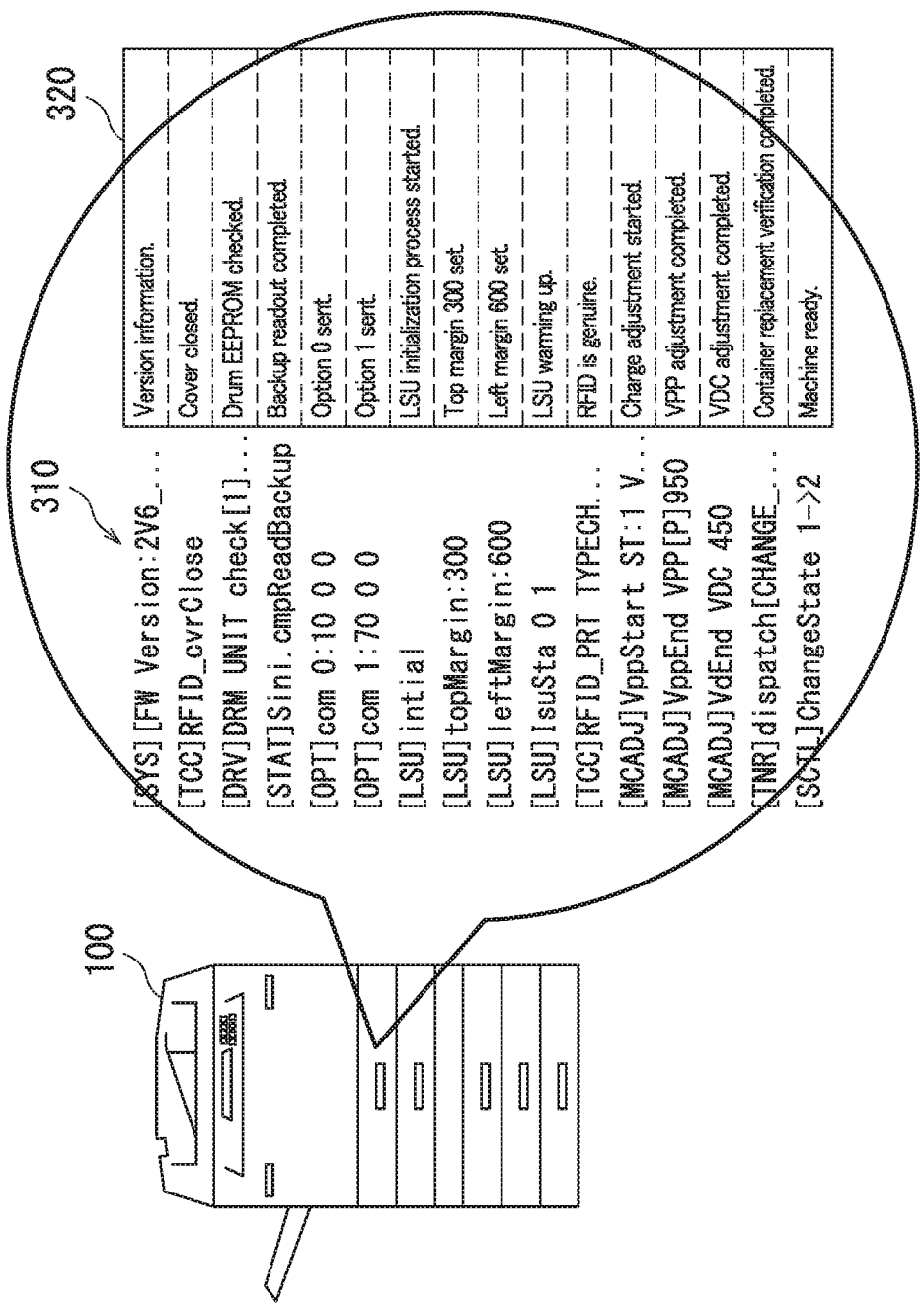
FIG. 3 is a diagram illustrating an example of software log information and translated content corresponding to the software log information according to the present embodiment.

Next, a fault presumption method performed by the image forming apparatus 100 of the present embodiment is described with reference to FIGS. 1 to 7. FIG. 3 is a schematic illustration for describing software log information 310 used by the image forming apparatus 100 in the fault presumption method. FIG. 3 is a diagram illustrating an example of the software log information 310 and translated content 320 of the software log information 310.

As described with reference to FIG. 1, the acquiring section 120 acquires the software log information 310 indicating the operational condition of the image forming apparatus 100 as the first log information or the second log information. The acquiring section 120 stores the acquired first log information or second log information in RAM built into the CPU or in a non-temporary storage medium. Note that the acquiring section 120 may acquire the software log information 310 from an external electronic device through a communication line.

In FIG. 3, the translated content 320 of the software log information 310 is illustrated so as to correspond to the software log information 310 for the sake of convenience. The translated content 320 of the software log information 310 presents the content of the software log information 310 in an easily understandable manner for the user.

FIG. 4 is a diagram illustrating an example of a software log dictionary 400 according to the present embodiment. As illustrated in FIG. 4, the software log dictionary 400 includes ID numbers 410 and dictionary content 420.

The ID numbers 410 are numbers in ascending order, for example. The ID numbers 410 are allocated so as to uniquely correspond to individual elements of the dictionary content 420.

The dictionary content 420 includes all lines of information entered in the software log information 310. The encoding section 1421 allocates the ID numbers 410 to individual elements of the software log information constituting the dictionary content 420 (in the following, the individual elements of the software log information to which the ID numbers 410 are allocated may be referred to as "words").

Figure 5:
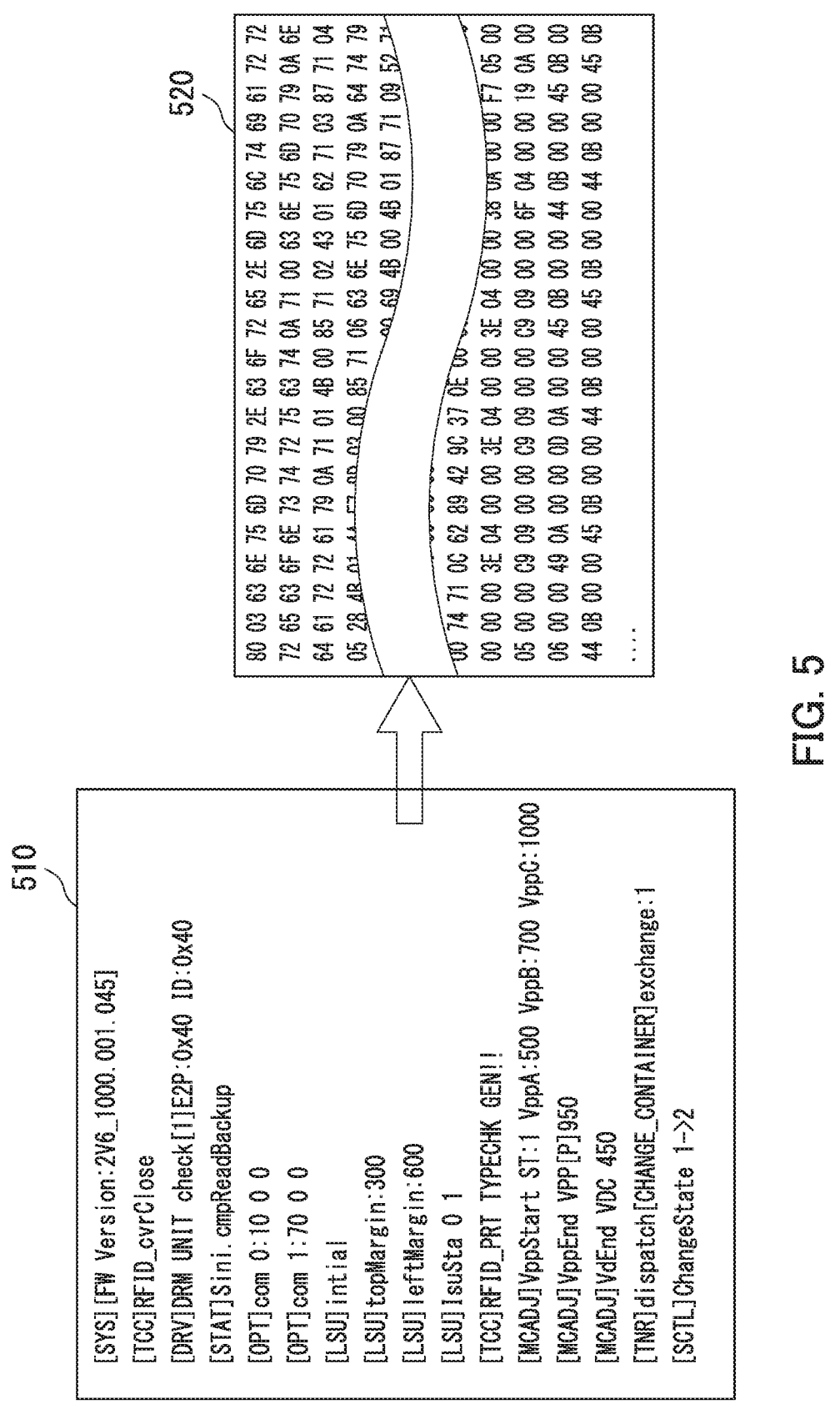

FIG. 5 is a diagram illustrating an example of a corpus 510 and binarized data 520 of the corpus 510 according to the present embodiment. Here, a "corpus" means an example of a sequence of phrases observed in a certain language or in a specific field of the language in a learning model as a target of natural language processing. Furthermore, the corpus is a database including a large number of computer-searchable phrases. The "corpus" of the present embodiment is also databased in the same manner as a corpus in a learning model as a target of natural language processing.

Figure 6:
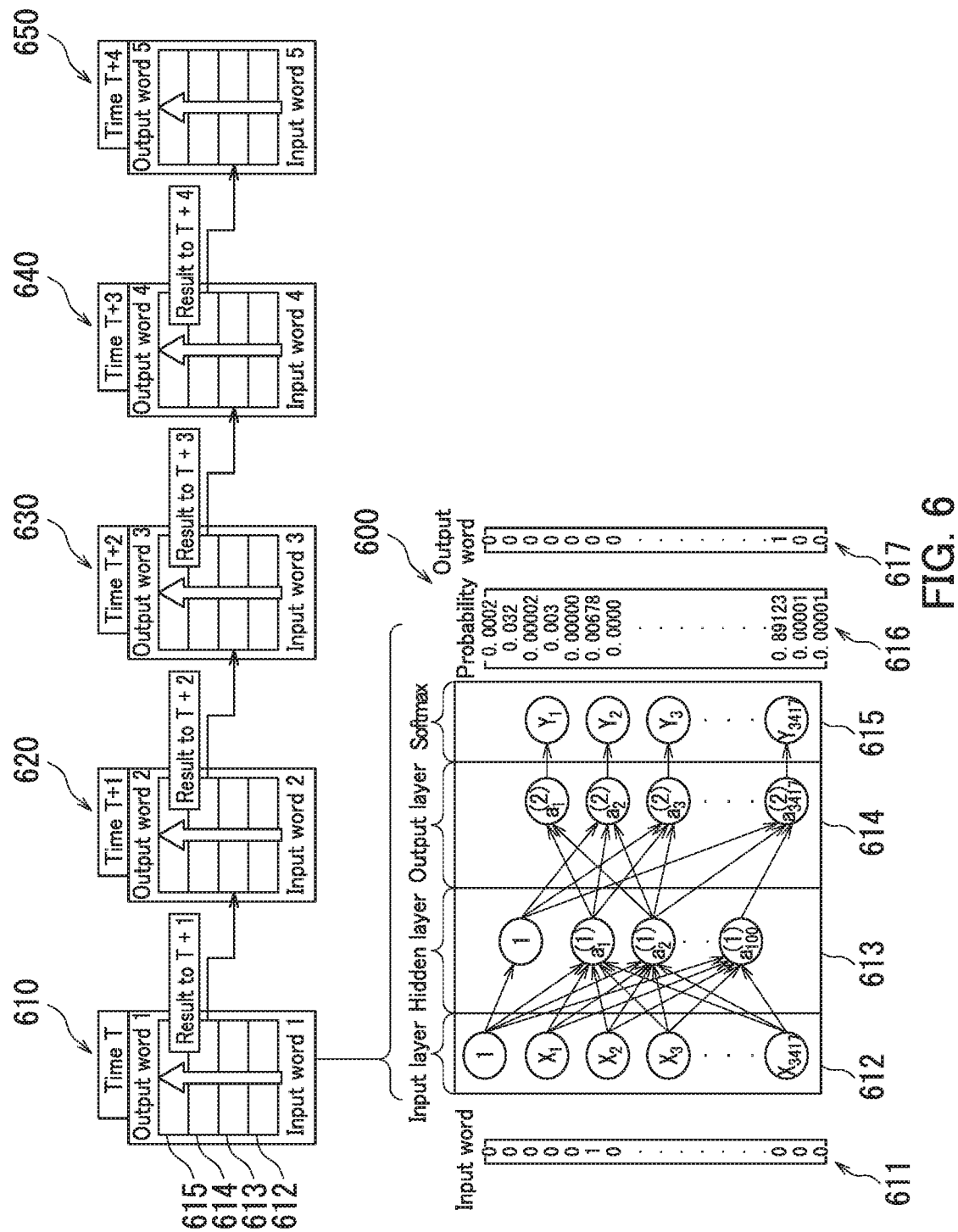
FIG. 6 is a schematic illustration of an example of a learning model including a recurrent neural network according to the present embodiment.

FIG. 6 is a schematic illustration of an example of a learning model including a recurrent neural network 600 according to the present embodiment. The recurrent neural network 600 includes an input layer 612, a hidden layer 613, an output layer 614, and a softmax 615. In the present embodiment, the first codes for example are entered into the input layer 612. Specifically, all of the first codes expressed using a sequence, or a so-called "one-hot vector", are entered into the input layer 612. Note that the first codes need not be expressed using a "one-hot vector", but may be entered unchanged into the input layer 612. The hidden layer 613 fulfills the role of propagating a value from the input layer 612 to the output layer 614. Specifically, the hidden layer 613 propagates a value from the input layer 612 to the output layer 614 through a function including "weight" and "bias". The output layer 614 outputs probability of appearance subsequent to a word input to the input layer 612. The softmax 615 indicates a softmax function. The softmax 615 reduces output values to a value of 0 or 1, and calculates each output value such that the sum of the output values is "1".

Furthermore, FIG. 6 illustrates an RNN 610 of a "time T", an RNN 620 of a "time T+1", an RNN 630 of a "time T+2", an RNN 640 of a "time T+3", and an RNN 650 of a "time T+4".

As illustrated in FIG. 6, the output value of the output layer 614 of the RNN 610 of the "time T" is input to the hidden layer 613 of the RNN 620 of the "time T+1". Therefore, the strength of the relationship between previous and subsequent software log information is sequentially transferred to the subsequent software log information.

Figure 7:
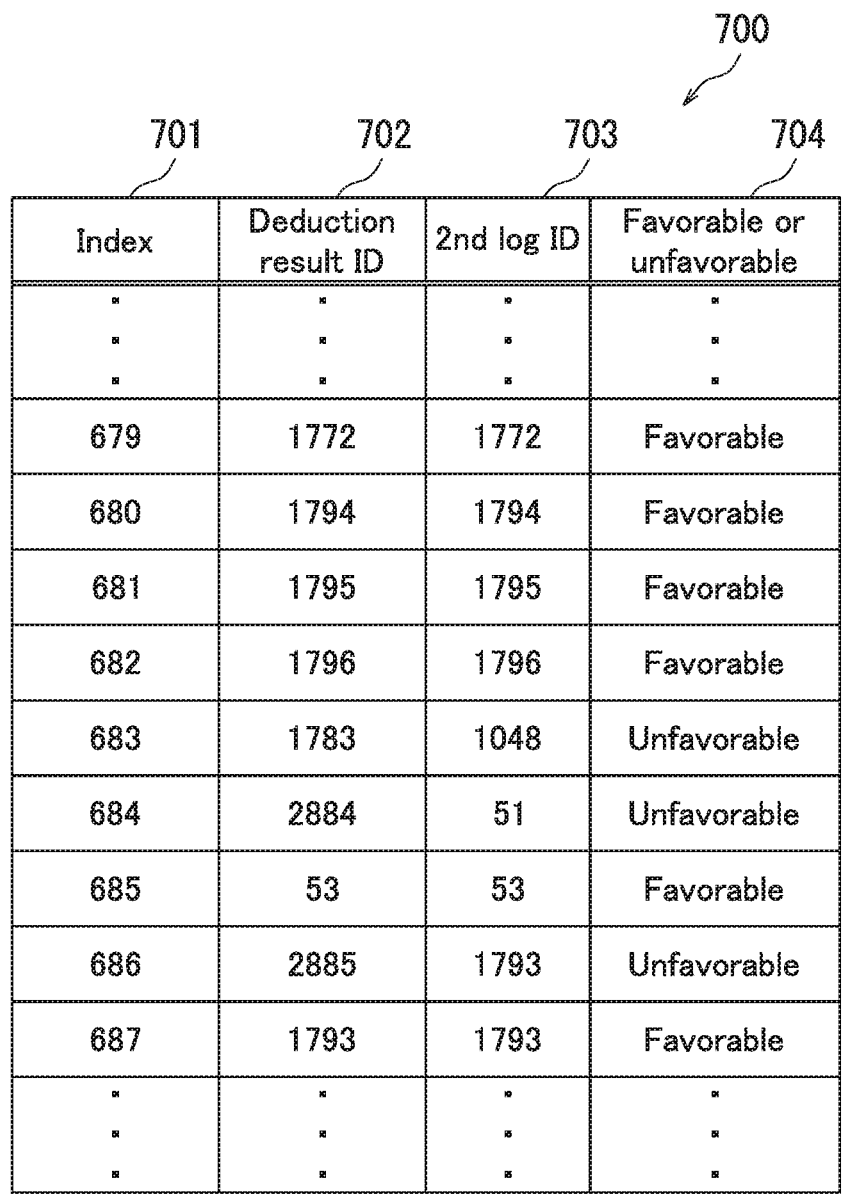
FIG. 7 is a diagram illustrating an example of a fault presumption result table according to the present embodiment.

FIG. 7 is an example of a fault presumption result table 700 according to the present embodiment. The fault presumption result table 700 includes an index column 701, a deduction result ID column 702, a second log ID column 703, and a favorable or unfavorable column 704. The index column 701 exhibits the order of the software log information constituting the deduced appearance order of the second log information. The deduction result ID column 702 exhibits a second code for each piece of the software log information constituting the deduced appearance order. The second log ID column 703 exhibits a second code for each piece of software log information constituting the actual appearance order of the second log information. The favorable or unfavorable column 704 exhibits results of results exhibited in the deduction result ID column 702 being compared to corresponding results exhibited in the second log ID column 703. Exhibition of "favorable" in the favorable or unfavorable column 704 indicates that a fault is unlikely in the operation of the image forming apparatus 100. When "unfavorable" is exhibited in the favorable or unfavorable column 704, a fault is likely in the operation of the image forming apparatus 100.

Among indices "679" to "687" in the index column 701, the second log ID column 703 for "683", "684", and "686" in the index column 701 are determined to be "unfavorable" as illustrated in FIG. 7. That is, the second log information for "683", "684", and "686" in the index column 701 indicates that a fault is likely in the operation of the image forming apparatus 100.

Figure 8:
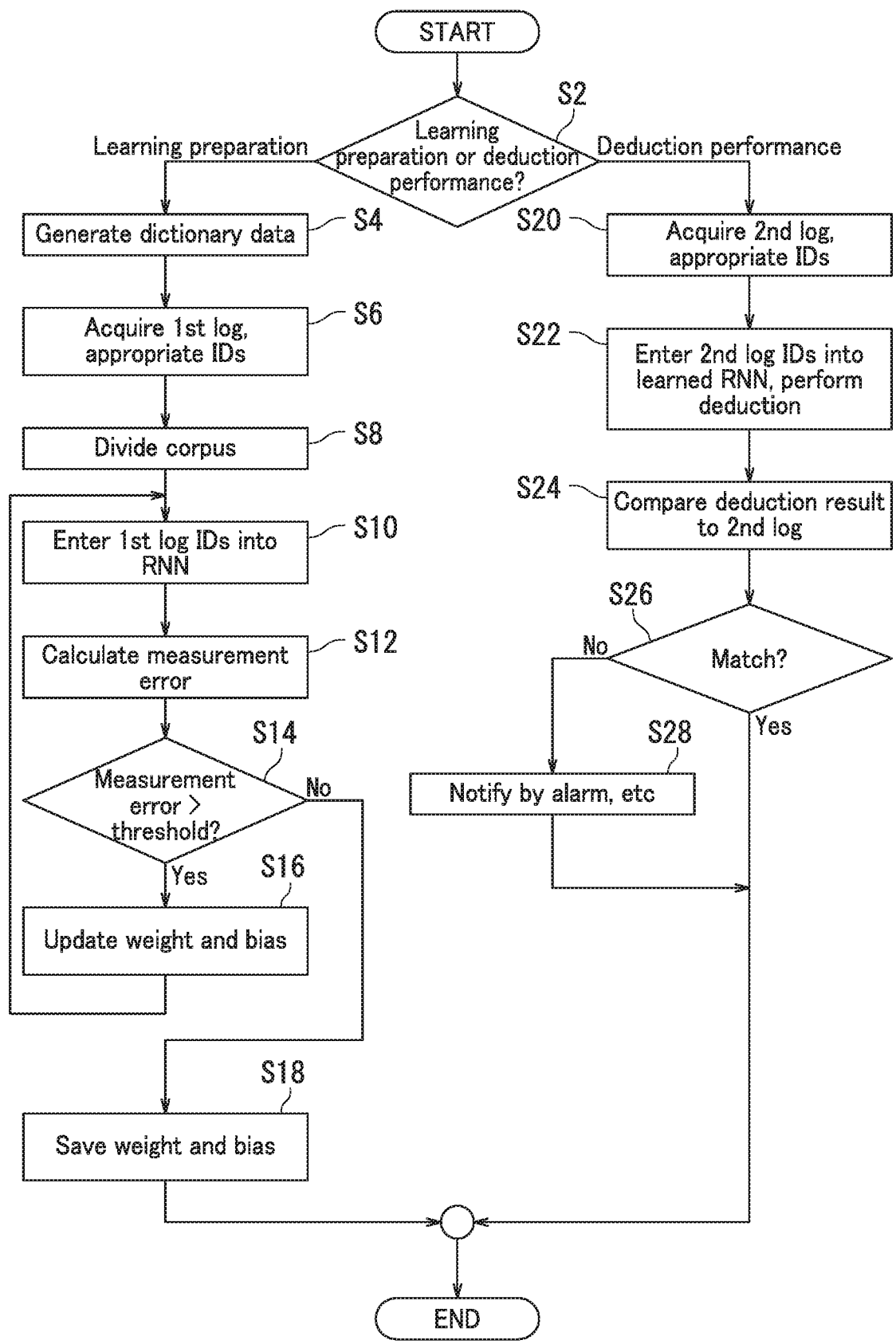
FIG. 8 is a flowchart depicting a fault presumption process according to the present embodiment.

Next, a fault presumption process performed by the image forming apparatus 100 of the present embodiment is described with reference to FIGS. 1 to 8. FIG. 8 is a flowchart depicting the fault presumption process performed by the image forming apparatus 100 of the present embodiment. Here, the "fault presumption process" refers to a process through which a fault is presumed through software or the like of the image forming apparatus 100. The fault presumption process is performed in Steps S2 to S28.

Step S2: The controller 1425 receives a learning preparation or a deduction performance instruction from the user through the receiving section 154. When the controller 1425 determines that a learning preparation instruction has been received from the user ("learning preparation" in Step S2), the process advances to Step S4. When the controller 1425 determines that a deduction performance instruction has been received from the user ("deduction performance" in Step S2), the process advances to Step S20.

Step S4: The encoding section 1421 generates the software log dictionary 400 to which all of the software log information to which ID numbers are assigned is recorded. The process advances to Step S6.

Step S6: The first acquiring section 122 acquires the first log information. The encoding section 1421 appropriates the ID numbers of the software log dictionary 400 for each piece of software log information of the first log information. The process advances to Step S8.

Step S8: The controller 1425 divides the corpus into a corpus for learning use, a corpus for cross validation use, and a corpus for test use. The process advances to Step S10.

Step S10: The learning section 1422 enters the ID numbers of the first log information into the RNN. The process advances to Step S12.

Step S12: The learning section 1422 calculates a measurement error. Specifically, the RNN calculates a measurement error. The process advances to Step S14.

Step S14: The learning section 1422 determines whether or not the measurement error is larger than a threshold. Specifically, the RNN determines whether or not the measurement error is larger than a threshold. When the learning section 1422 determines that the measurement error is larger than the threshold (Yes in Step S14), the process advances to Step S16. When the learning section 1422 determines that the measurement error is not larger than the threshold (No in Step S14), the process advances to Step S18.

Step S16: The learning section 1422 updates a weight value and a bias value. Specifically, the RNN updates a weight value and a bias value. The process returns to Step S10.

Step S18: The learning section 1422 saves the weight value and the bias value. Specifically, the RNN saves the weight value and the bias value. As a result, a learned RNN is generated. The process ends.

Step S20: The second acquiring section 124 acquires the second log information. The encoding section 1421 appropriates the ID numbers of the software log dictionary 400 for each piece of software log information in the second log information. The process advances to Step S22.

Step S22: The deducing section 1423 enters the ID numbers of the second log information into the learned RNN and performs deduction. Specifically, the deducing section 1423 enters the second codes of the second log information into the learned RNN. The deducing section 1423 causes the RNN to output a second probability distribution. The deducing section 1423 performs deduction based on the second probability distribution output by the RNN and derives a deduced appearance order of the second log information as a deduction result. The process advances to Step S24.

Step S24: The determining section 1424 determines whether or not the deduced appearance order indicated by the deduction result matches an actual appearance order indicated by the second log information. The process advances to Step S26.

Step S26: When the determining section 1424 determines that the deduction result matches the output log (Yes in Step S26), the process ends. When the determining section 1424 determines that the deduction result does not match the output log (No in Step S26), the process advances to Step S28.

Step S28: The audio output section 156 notifies the user with an alarm sound or the like. The process ends.

As described above, faults can be grasped more comprehensively according to the image forming apparatus 100 of the present embodiment.

The embodiment of the present disclosure is described above with reference to the accompanying drawings. However, the present disclosure is not limited to the above embodiment and may be implemented in various manners within a scope not departing from the gist thereof (as illustrated below in (1) and (2), for example). Furthermore, various disclosures may be created by appropriately combining elements of configuration disclosed in the above embodiment. For example, some of the elements of configuration may be removed from all of the elements of configuration described in the embodiment. Furthermore, elements of configuration may be appropriately combined across different embodiments. The drawings illustrate main elements of configuration schematically to facilitate understanding. Aspects such as length, number, and interval of the elements of configuration illustrated in the drawings may differ in practice for convenience of drawing preparation. Furthermore, aspects such as shape and dimension of the elements of configuration described in the above embodiments are merely examples and not particular limitations. The elements of configuration may be variously altered within a scope not substantially departing from the effects of the present disclosure.

(1) In the above description, the image forming apparatus 100 is an electrographic image forming apparatus, but the present disclosure is not limited as such. The image forming apparatus 100 may be another type of image forming apparatus. For example, the image forming apparatus 100 may be an inkjet image forming apparatus.

(2) Additionally, the present disclosure may be implemented as a fault presumption method with the characteristic means of configuration of the information processing device according to the present disclosure changed to steps, or implemented as a control program including those steps. The program may be distributed through a non-temporary storage medium such as a CD-ROM or distribution medium such as a communication network.

What is claimed is:

1. An information processing device comprising a processor, wherein
the processor includes:
an acquiring section configured to acquire first log information indicating an operational condition of an electronic device;
an encoding section configured to assign first codes uniquely corresponding to the first log information to the first log information; and
a learning section configured to cause a learning model that uses a neural network to learn by applying the first codes to the learning model so as to output a first probability distribution indicating an appearance probability of the first log information corresponding to the first codes, wherein
the learning section enters all the first codes in order into the learning model including a recurrent neural network and causes the learning model to learn appearance probability of all of the first codes,
the learning section calculates a measurement error related to an appearance order of the first codes indicating an output result output from the learning model and an appearance order of the first codes which is training data, and
the learning section updates a parameter of the learning model based on the calculated measurement error.

2. The information processing device according to claim 1, wherein
the first log information is software log information indicating the operational condition of the electronic device during execution of a control program.

3. The information processing device according to claim 1, wherein
the encoding section assigns identification numbers as the first codes to the first log information.

4. The information processing device according to claim 1, wherein
the neural network is a recurrent neural network, and
the learning section inputs the first codes into the learning model that uses the recurrent neural network and causes the learning model to learn the first probability distribution based on an output result of the learning model.

5. The information processing device according to claim 4, wherein
the processor further comprises:
a deducing section; and
a determining section,
the acquiring section acquires second log information indicating the operational condition of the electronic device,
the first log information and the second log information are information of the same type,
the encoding section assigns second codes uniquely corresponding to the second log information to the second log information,
the deducing section inputs the second codes into the learning model and deduces a second probability distribution indicating an appearance probability of the second log information based on an output result of the learning model, and
the determining section determines likelihood of a fault in the electronic device based on a comparison between a deduced appearance order of the second log information specified by the deduced second probability distribution and an actual appearance order indicated by the second log information.

6. A fault presumption method comprising:
acquiring first log information indicating an operational condition of an electronic device;
assigning first codes uniquely corresponding to the first log information to the first log information;
causing a learning model that uses a neural network to learn by applying the first codes to the learning model so as to output a first probability distribution indicating an appearance probability of the first log information corresponding to the first codes;
entering all the first codes in order into the learning model including a recurrent neural network and causing the learning model to learn appearance probability of all of the first codes;
calculating a measurement error related to an appearance order of the first codes indicating an output result output from the learning model and an appearance order of the first codes which is training data, and
updating a parameter of the learning model based on the calculated measurement error.

* * * * *